(12) United States Patent
Ferreri et al.

(10) Patent No.: US 9,495,621 B1
(45) Date of Patent: Nov. 15, 2016

(54) COLOR CALIBRATION MECHANISM

(71) Applicants: Vincent William Ferreri, Federal Heights, CO (US); Walter F. Kailey, Broomfield, CO (US)

(72) Inventors: Vincent William Ferreri, Federal Heights, CO (US); Walter F. Kailey, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/734,099

(22) Filed: Jun. 9, 2015

(51) Int. Cl.
*G06K 15/02* (2006.01)

(52) U.S. Cl.
CPC .................................. *G06K 15/027* (2013.01)

(58) Field of Classification Search
USPC ............... 358/1.9, 1.11, 500, 504, 406, 1.18, 358/1.15; 355/99
See application file for complete search history.

(56) References Cited

U.S. PATENT DOCUMENTS

| | | | | |
|---|---|---|---|---|
| 5,528,377 A | * | 6/1996 | Hutcheson | ........... H04N 1/6022 347/15 |
| 7,016,078 B2 | * | 3/2006 | Shoji | ...................... G06K 15/02 358/1.9 |
| 7,092,119 B1 | * | 8/2006 | Hinds | .................. H04N 1/6033 358/1.11 |
| 8,089,657 B2 | | 1/2012 | Matsuo | |
| 8,130,411 B2 | | 3/2012 | Kim | |
| 8,223,399 B1 | * | 7/2012 | Lee | ...................... H04N 1/6033 358/1.9 |
| 8,358,440 B2 | | 1/2013 | Ernst et al. | |
| 8,542,418 B2 | | 9/2013 | Chandu et al. | |
| 8,705,121 B2 | | 4/2014 | Hattenberger | |
| 2011/0280589 A1 | * | 11/2011 | Chandu | .............. G03G 15/5062 399/15 |
| 2013/0265598 A1 | | 10/2013 | Donaldson et al. | |
| 2014/0160498 A1 | * | 6/2014 | Yano | ...................... G06F 3/1208 358/1.9 |
| 2014/0369701 A1 | * | 12/2014 | Kuo | ...................... G03G 15/50 399/15 |
| 2015/0130886 A1 | * | 5/2015 | Yaguchi | ............... G03G 15/043 347/224 |

* cited by examiner

*Primary Examiner* — Jerome Grant, II
(74) *Attorney, Agent, or Firm* — Blakely, Sokoloff, Taylor & Zafman LLP (57) ABSTRACT

A method for calibrating a printer is disclosed. The method includes receiving data corresponding to a Reference curve for the printer, receiving data corresponding to a Measurement curve representing a current response for the printer and generating a Target curve that follows the Reference curve and transitions to the Measured curve.

20 Claims, 7 Drawing Sheets

COLOR CALIBRATION MECHANISM

FIELD OF THE INVENTION

The invention relates to the field of production printing systems, and in particular, to calibration of production printing systems.

BACKGROUND

Production printing systems associated with data processing enterprises generally include a localized print controller within the printing system. The print controller controls the overall operation of the printing system including, for example, host interfacing, interpretation or rendering, and lower level process control or interface features of print engines of the printing system. However, prior to operation a printing system is typically calibrated.

Calibration entails having a given Reference curve, acquiring a Measurement curve depicting the printer's current state, deducing a Target curve from the Reference and Measurement curves by either normalizing the Measured and Reference curves to one another, or doing nothing to the Measured and Reference curves. Finally a Tone curve is created by comparing the Target and Measured curves in a way such that at each device value, x, the difference Target(x)−Measured(toneCurve(x)) is minimized.

Problems can arise in the deducing of the Target curve. For instance, if normalization of the curves is not performed the Tone curve may become clipped, which may either saturate too early or never saturate at all. The Tone curve may also lose considerable contrast in the low device value range (e.g. be too flat) in this case. If performing the standard normalization, local features of the Reference curve are preserved, but absolute measurements are not. Thus, the shape of features will be maintained, but their absolute reflectance will not be. This can lead to a change in the absolute contrast in the light or dark areas. If the peak optical density response of the Measured curve is less than the peak of the Reference curve (e.g., the printer cannot print as dark as ideally desired), the contrast across the entire printer output range will be degraded in order to accommodate the decrease in dynamic range.

Accordingly, a calibration mechanism is desired.

SUMMARY

In one embodiment, a method for calibrating a printer is disclosed. The method includes receiving data corresponding to a Reference curve for the printer, receiving data corresponding to a Measurement curve representing a current response for the printer and generating a Target curve that follows the Reference curve and transitions to the Measured curve.

BRIEF DESCRIPTION OF THE DRAWINGS

A better understanding of the present invention can be obtained from the following detailed description in conjunction with the following drawings, in which.

DETAILED DESCRIPTION

A calibration mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
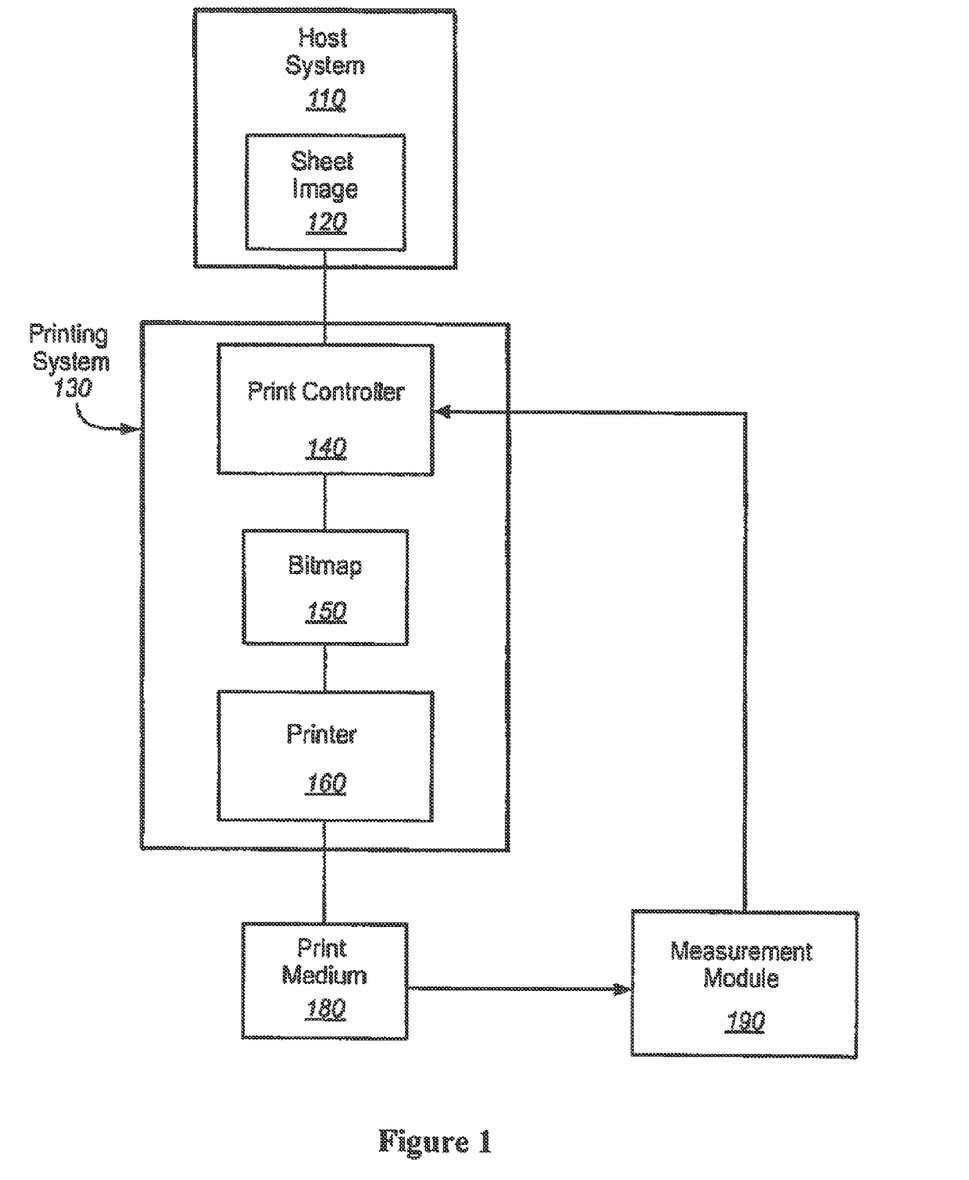
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
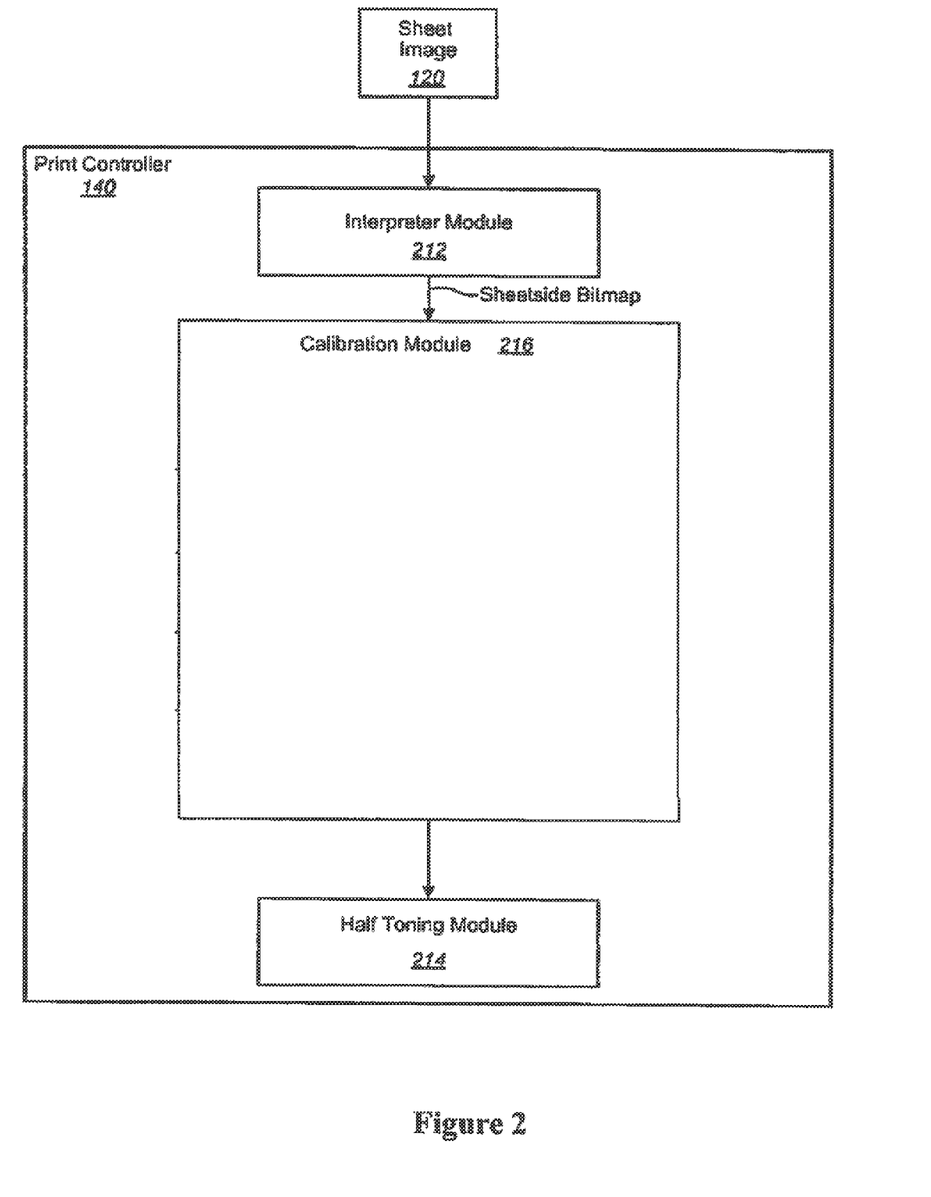
FIG. 2 is a block diagram of one embodiment of a print controller.

FIG. 2 is a block diagram illustrating an exemplary print controller 140. The print controller 140, in its generalized form, includes an interpreter module 212, a halftoning module 214, and a calibration module 216. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a 2-dimensional array of pixels representing an image of the print job (i.e., a CTI), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of toner. For example, the halftoning module 214 may convert the pixels to halftone patterns of CMYK toner for application to the paper. Once computed, the halftoning module 214 transfers the converted sheetside bitmaps to the printer 160 to apply the toner to the paper. The print controller 140 may further include other modules such as a print job storage system, a raw data preprocessing system, and a bitmap processing system, etc.

The calibration module 216 includes hardware, software, firmware, or any combination thereof, that is operable to calibrate the printer 160 for a particular print medium type based on previously determined color characterizations of other print medium types. To assist in the calibration, a measurement module 190 may be used to detect colors printed to various tangible mediums. For example, the measurement module 190 may be an optical densitometer or a spectrophotometer that detects colors on the print medium 180 and converts the detected colors to a detected color characterization for use in calibrating the printer 160.

In one embodiment, calibration module 216 deduces a Target curve from Reference and Measurement curves, as well as generates a Tone curve by comparing the Target and Measured curves. A curve is defined as a set of (x, y) points where the x-value represents various Device Values (usually spanning the range from 0% to 100%), and the y-value represents the "darkness" or reflectance of a printed color at that point. The "darkness" is usually measured as an Optical Density (OD), although Lightness (L*) and/or Luminance (Y) are not uncommon. Other embodiments may feature different measures. The y-values are directly related to the quantity of ink/toner that was deposited onto the page at the corresponding x-values.

The Device Value refers to a requested print value, in which a digital value of 0 is a device value of 0% and corresponds to no ink/toner being deposited on the paper and a digital value of 255 (e.g., for an 8-bit printer) is a device value of 100% and corresponds to full ink/toner (e.g., the largest/darkest ink/toner mark that the print head can support).

The curves discussed below are understood to be monotonic (e.g., one-to-one and/or invertible), and in such an embodiment, calibration module 216 supports smoothing functions to ensure.

A Reference curve is a pre-defined and/or built-in curve that is the desired output curve for a printer. This is a curve that is generally measured on day zero and is stored in printing system 130 for future calibrations to utilize. This represents an ideal printer response and is the source from which the Target curve will be derived. This curve may not be completely representative of what a post-calibration curve will look like, but generally its shape and nominal values are what should result.

A Measured curve is a curve representing the current printer response in an un-calibrated state as measured by measurement module 190. This curve is generally created by printing a sample page and then measuring the printed patches with an optical spectrometer. The lightest and darkest colors in a Measurement curve define the printer's maximum dynamic range.

A Target curve is a curve that most closely resembles what a post-calibration measured curve (commonly called a Verification curve) should/will resemble. The Target curve generally has the same "shape" and "features" of the Reference curve, but may be slightly distorted due to the limitations on the printer's output dynamic range and/or as a result of application of the maximum output constraints.

A Tone curve curve is a calibration look-up-table that is used to apply the calibration. For each input device value, this curve specifies the output device value such that the Target curve will be produced after a calibration.

Figure 3A:
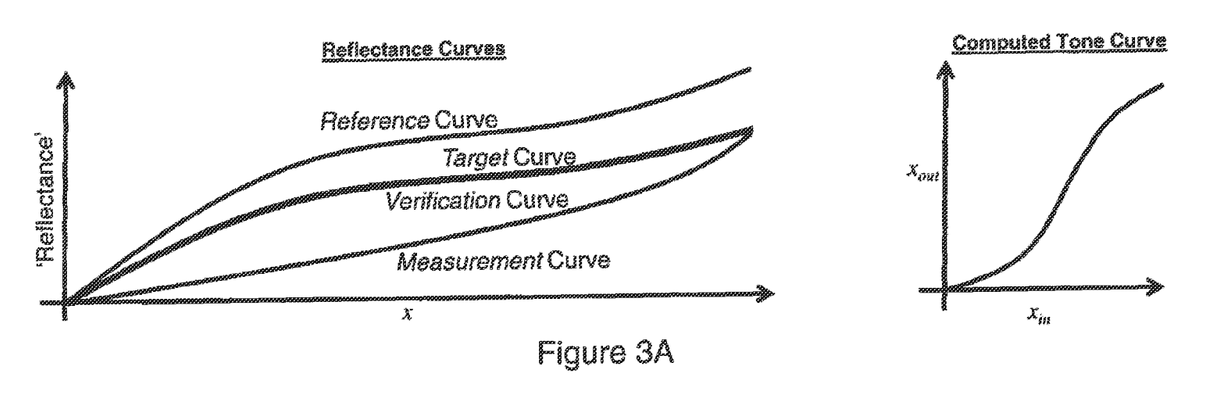
FIGS. 3A and 3B illustrate exemplary data, and corresponding tone, curves.
Figure 3B:
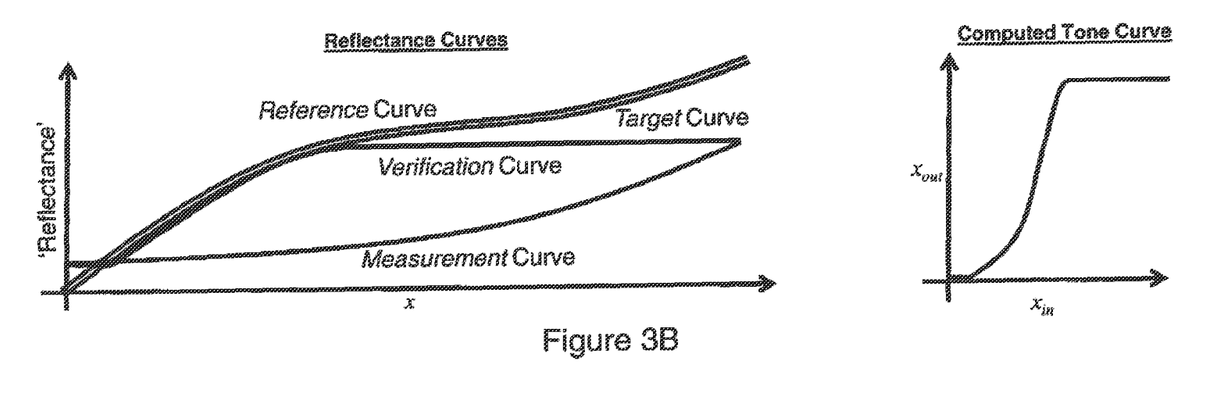

As discussed above, calibration that implements normalization may result in a change in the absolute contrast in the light or dark areas. FIG. 3A illustrates exemplary data curves and a corresponding Tone curve when normalization is performed. As shown in FIG. 3A, the Reference curve goes to an optical density of ink that the printing system 130 cannot obtain. Moreover, if normalization is not performed, clipping and saturation of the Tone curve may result (not properly utilizing the dynamic range). FIG. 3B illustrates exemplary data curves and a corresponding tone curve when normalization is not performed. As shown in FIG. 3B, the post-calibration Verification curve illustrates the extreme degradation in print quality.

According to one embodiment, calibration module 216 performs calibration by generating a Target curve that follows the Reference curve and transitions smoothly to the Measured curve. Such an embodiment preserves contrast (features) in the highlight region of the Reference curve, as well as preserves the general shape of the Reference curve by smoothly deforming the Reference curve. Additionally, the full dynamic range of the printer 160 is utilized (e.g., as determined from the Measured curve), while the constraint of monotonicity on the Target curve is obeyed. Accordingly, calibration module 216 strikes an adjustable balance between preserving contrast and shape, while always fulfilling utilizing the printer 160 dynamic range and obeying the constraint of monotonicity on the Target curve.

Moreover, an affine scaling formula may be realized as a special case, which results in printer 160 being calibrated to approximate the desired output colors well when output is color managed. Further, detail in highlight regions will be preserved with or without color management, resulting in accurate and vibrant printed output.

Figure 4:
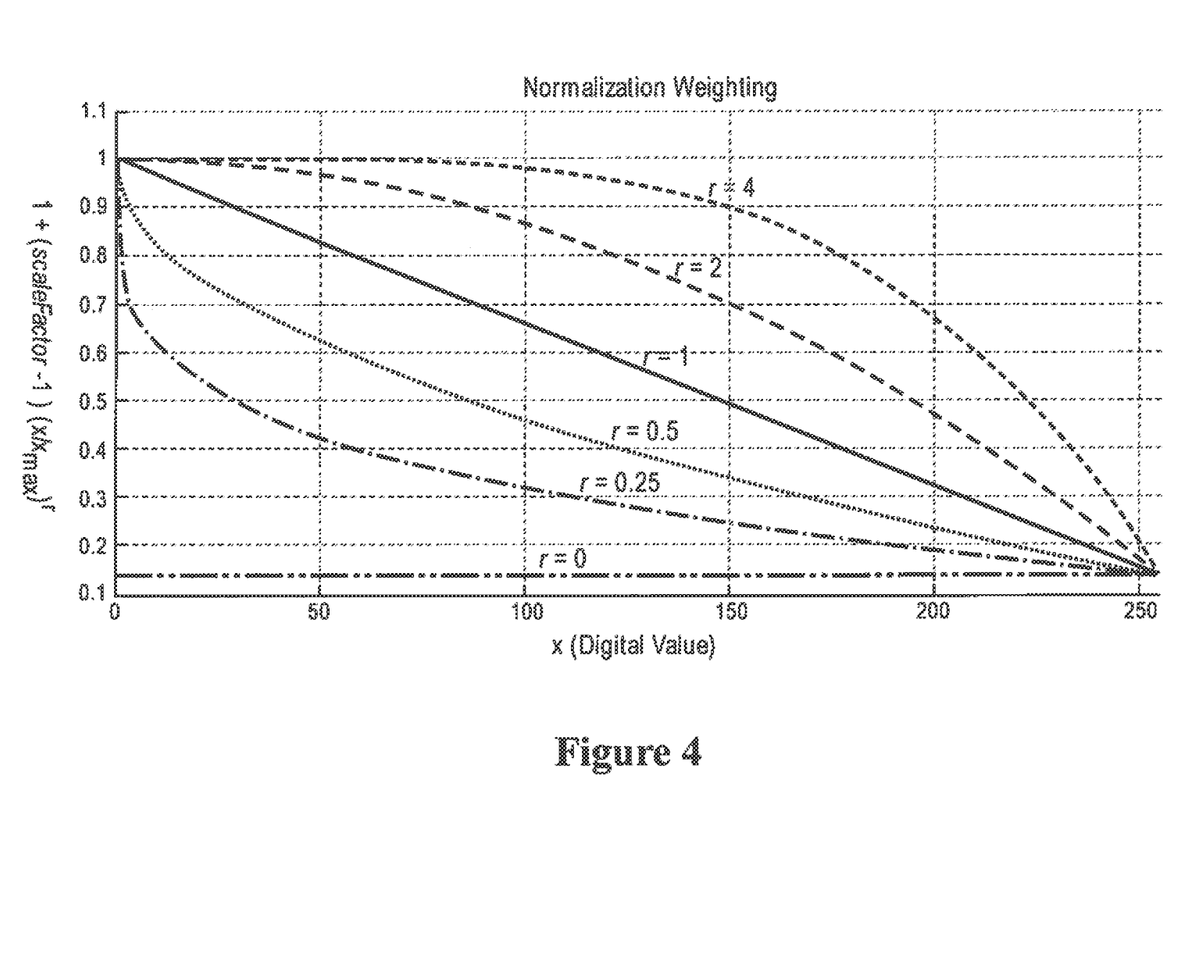
FIG. 4 illustrates one embodiment of normalization weighting.
Figure 5:
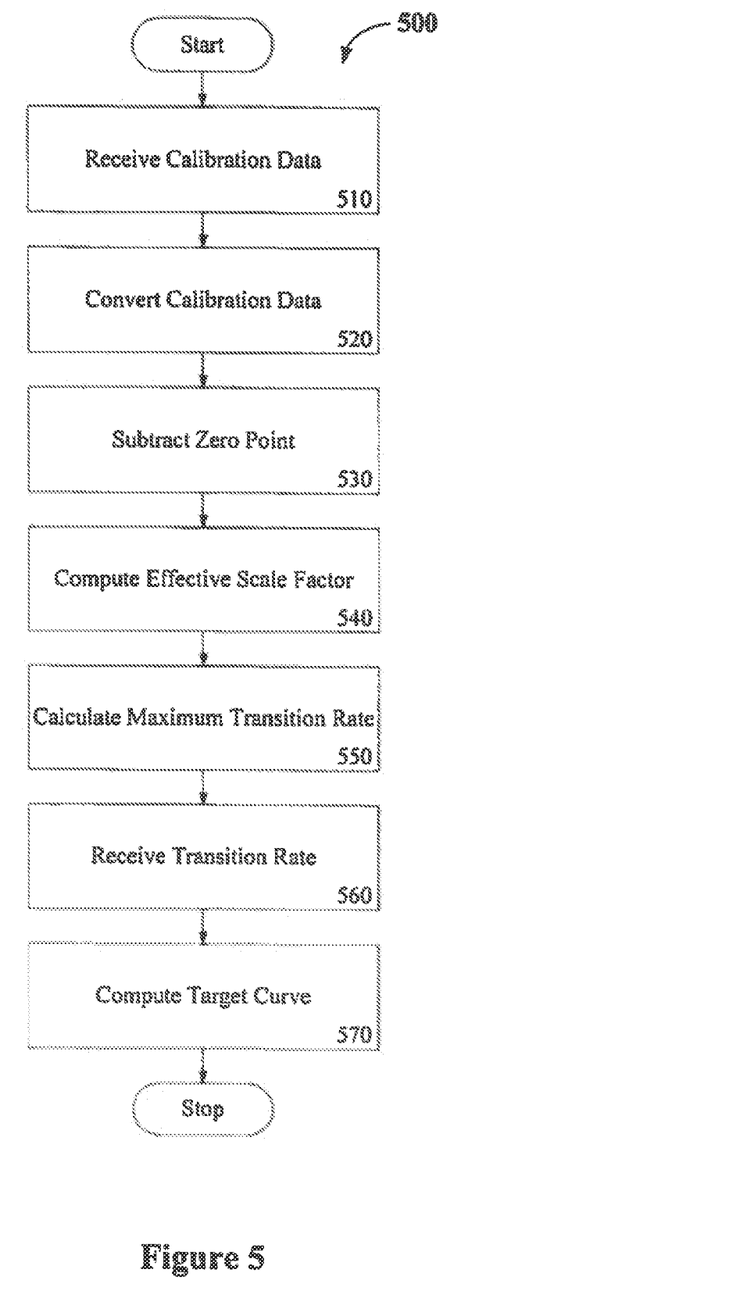
FIG. 5 is a flow diagram illustrating one embodiment of a calibration process.

In one embodiment, calibration module 216 applies the following to perform calibration:

$$T(x, r) = (R(x) - R_{min}) \left[ 1 + \left[ \frac{M_{max} - M_{min}}{R_{max} - R_{min}} - 1 \right] \left[ \frac{x}{x_{max}} \right]^r \right] + M_{min}$$

where, x is the device value; T(x) is the Target Curve; M(x) is the Measured Curve; R(x) is the Reference Curve; $M_{min}$ is the minimum value of M(x); $M_{max}$ is the maximum value of M(x); $R_{min}$ is the minimum value of R(x); $R_{max}$ is the maximum value of R(x); $x_{max}$ is the maximum of the device values (usually 255 or 100%); r is the transition rate;

According to one embodiment, the maximum transition rate (e.g., to preserve monotonicity) can be found by solving $$\frac{d}{d_x}[T(x, r)] \geq 0$$

for the maximum r across all x. In such an embodiment, the traditional affine scaling formula results if r=0. Further, a linear transition rate occurs when r=1. In one embodiment, a larger r leads to a faster (e.g., steeper) transition from the Reference curve to the Measured curve. FIG. 4 illustrates one embodiment of normalization weighting for various r values FIG. 5 is a flow diagram illustrating one embodiment of a method 500 for calibrating a printer. Method 500 may be performed by processing logic that may comprise hardware (e.g., circuitry, dedicated logic, programmable logic, etc.), software (such as instructions run on a processing device), or a combination thereof. In one embodiment, method 500 may be performed by calibration module 216. The processes of method 500 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

At processing block 510, receiving Measurement and Reference calibration data. At processing block 520, the Measurement and Reference calibration data are both converted to a common unit of measure (e.g., Optical Density, Lightness, Luminance, etc.). At processing block 530, a zero-point is subtracted from each set measurement so as to translate both sets to a common zero-point at 0.0. At processing block 540, an effective scale factor is computed. In one embodiment the scale $$\text{factor} = \frac{\max(M_{(x)})}{\max(R_{(x)})}.$$

At processing block 550, the maximum transition rate for the Target curve is calculated. As discussed above, the maximum transition rate is calculated by solving $$\frac{d}{d_x}[T(x, r)] = 0,$$

where numerical derivatives are computed for M(x). Subsequently, numerical methods are used to find the optimal r across all x. At processing block 560, a user specified transition rate for the Target curve is received.

In one embodiment, the transition rate is in the range [0-maxTransitionRate], which will determine how rapidly the Target curve is made to traverse between the Measured and Reference curves. A rate of 0 will mean that the Target curve uniformly/constantly transitions from the Reference curve to the Measured curve. Higher rates will mean that the Target curve follows the Reference curve for longer before transitioning. The maximum transition rate is such that the Target curve is just starting to become non-monotonic (e.g., flat) in any given region.

At processing block 570, the Target curve is computed. Given the rate and scale Factor, the Target curve is computed as T(x, r)=R(x)*W(x, rate, scale Factor), where W is the weighting function $$W(Rx, \text{rate, scale Factor}) = 1 + (\text{scale Factor} - 1) * \left[\frac{x}{x_{max}}\right]^r.$$

The above-described method produces smooth, monotonic curves that transition from a Reference curve to a Measured curve at a user-specified rate. This Target curve follows the shape of the Reference curve at the low digital values (highlight) region and transitions to the peak of the Measured curve, thus preserving the full dynamic range of the printer.

Figure 6A:
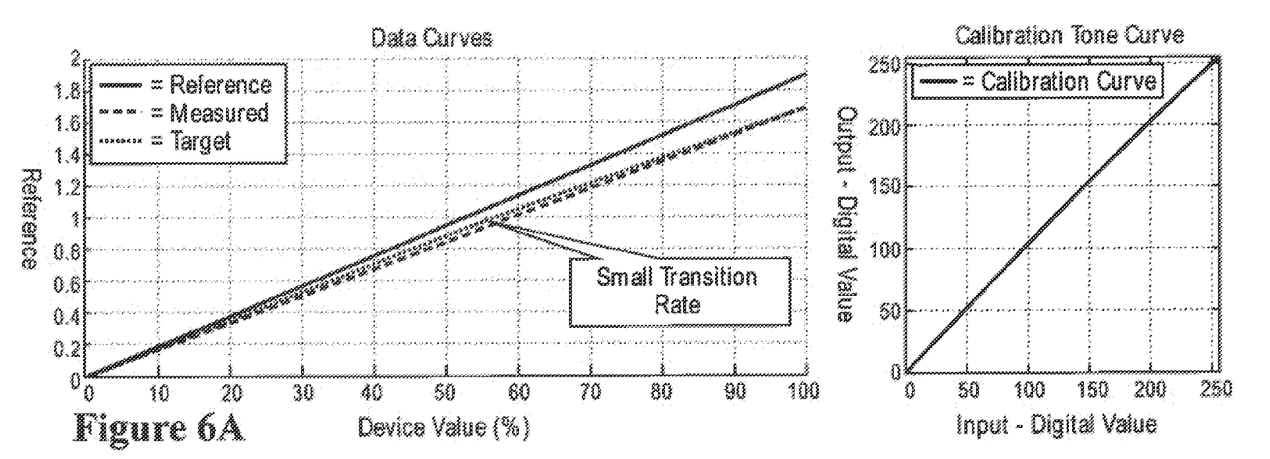
FIGS. 6A and 6B illustrate embodiments of data, and corresponding tone, curves.
Figure 6B:
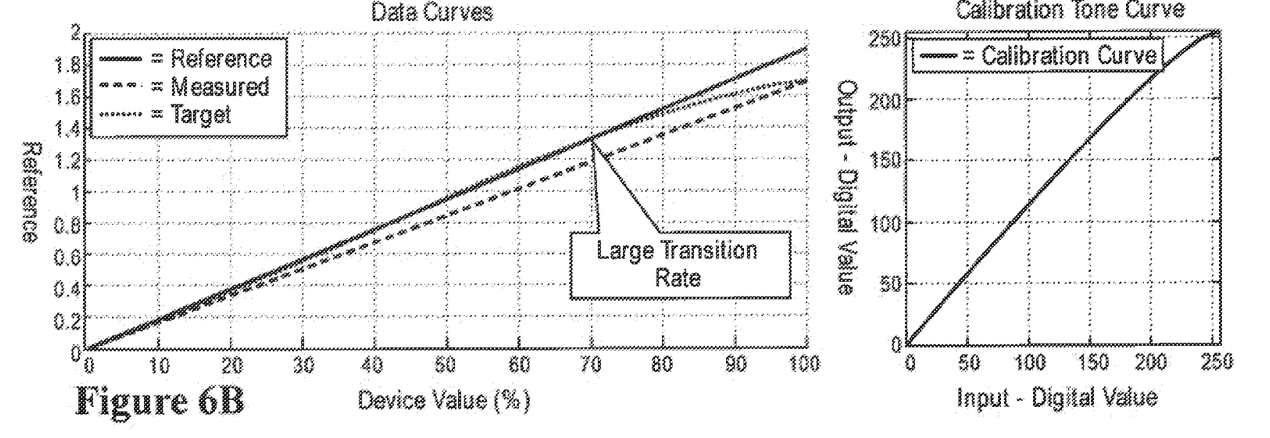

FIGS. 6A and 6B illustrate embodiments of calibrated Target curves, and corresponding Tone curves, calculated according to Method 500. FIG. 6A shows a Target curve having a small transition rate (e.g., r≈0). As shown in FIG. 6A, the Target curve uniformly/constantly transitions from the Reference curve to the Measured curve. FIG. 6B shows a Target curve having a larger transition rate (e.g., r≈0.5). As shown in FIG. 6B, the Target curve follows the Reference curve for longer before transitioning to the Measured curve.

Figure 7:
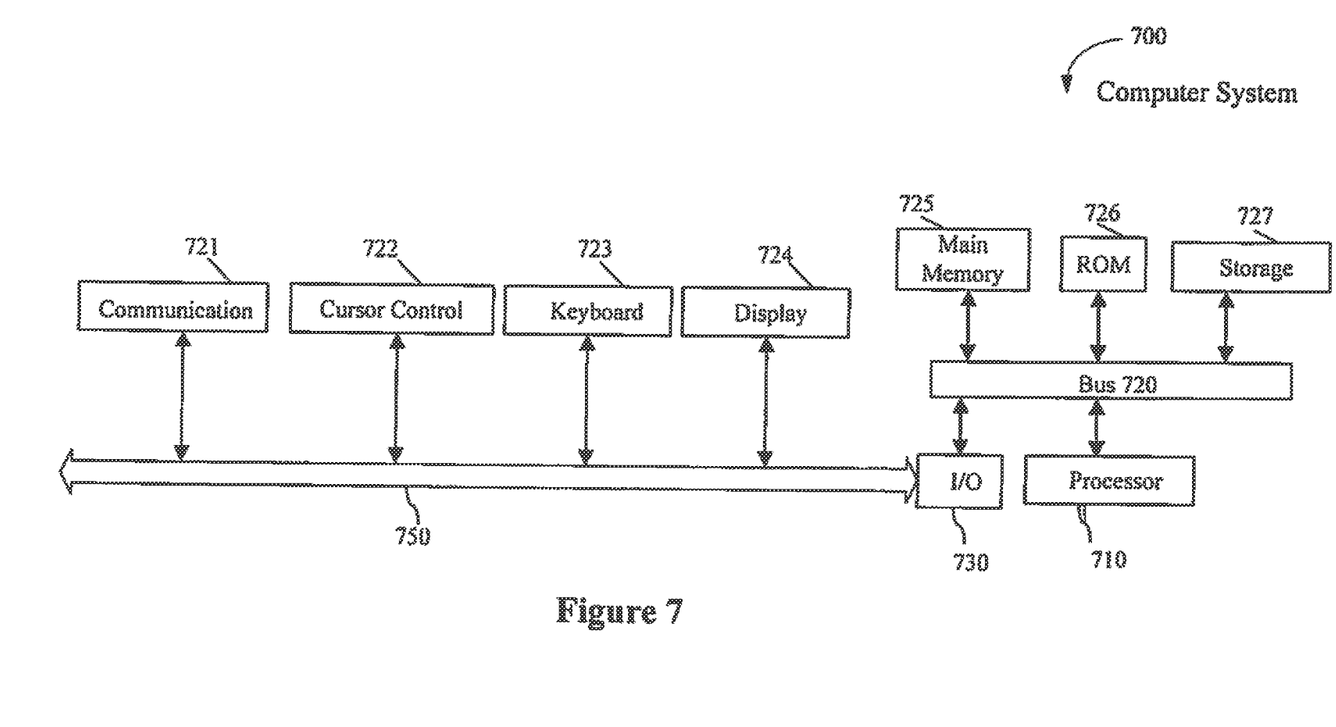
FIG. 7 illustrates one embodiment of a computer system.

FIG. 7 illustrates a computer system 700 on which printing system 130 may be implemented. Computer system 700 includes a system bus 720 for communicating information, and a processor 710 coupled to bus 720 for processing information.

Computer system 700 further comprises a random access memory (RAM) or other dynamic storage device 727 (referred to herein as main memory), coupled to bus 720 for storing information and instructions to be executed by processor 710. Main memory 727 also may be used for storing temporary variables or other intermediate information during execution of instructions by processor 710. Computer system 700 also may include a read only memory (ROM) and or other static storage device 726 coupled to bus 720 for storing static information and instructions used by processor 710.

A data storage device 725 such as a magnetic disk or optical disc and its corresponding drive may also be coupled to computer system 700 for storing information and instructions. Computer system 700 can also be coupled to a second I/O bus 750 via an I/O interface 730. A plurality of I/O devices may be coupled to I/O bus 750, including a display device 724, an input device (e.g., an alphanumeric input device 723 and or a cursor control device 722). The communication device 721 is for accessing other computers (servers or clients). The communication device 721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a processor, cause the processor to perform operations comprising calibrating a printer, including:
   receiving calibration data corresponding to a Reference curve for the printer;
   receiving calibration data corresponding to a Measurement curve representing a current response for the printer; and
   generating a Target curve that follows the Reference curve and transitions to the Measured curve.

2. The non-transitory machine readable medium of claim 1 including data that, when accessed by a processor, cause the machine to further perform operations comprising computing a scale factor.

3. The non-transitory machine readable medium of claim 2 wherein the scale factor is represented by a maximum value of the Measured curve divided by a maximum value of the Reference curve.

4. The non-transitory machine readable medium of claim 3 including data that, when accessed by a processor, cause the processor to further perform operations comprising calculating a maximum transition rate.

5. The non-transitory machine readable medium of claim 4 including data that, when accessed by a processor, cause the processor to further perform operations comprising receiving a specified transition rate for the Target curve.

6. The non-transitory machine readable medium of claim 5 wherein a larger specified transition rate results in the Target Curve following the Reference curve longer prior to transitioning to the Measured curve.

7. The non-transitory machine readable medium of claim 5 including data that, when accessed by a processor, cause the processor to further perform operations comprising computing the Target curve.

8. The non-transitory machine readable medium of claim 7 wherein the Target curve is computed by multiplying the specified transition rate with a weighting function.

9. The non-transitory machine readable medium of claim 7 including data that, when accessed by a processor, cause the processor to further perform operations comprising converting the data corresponding to the Measurement curve and the data corresponding to the Reference curve to a common unit of measure.

10. The non-transitory machine readable medium of claim 9 including data that, when accessed by a processor, cause the processor to further perform operations comprising subtracting a zero-point from data corresponding to the Measurement curve and the data corresponding to the Reference curve.

11. A printing system comprising:
   a printer; and
   print controller having a processor to execute a calibration module to calibrate the printer, including receiving calibration data corresponding to a Reference curve for the printer, receiving calibration data corresponding to a Measurement curve representing a current response for the printer and generating a Target curve that follows the Reference curve and transitions to the Measured curve.

12. The printing system of claim 11 wherein the calibration module computes a scale factor.

13. The printing system of claim 12 wherein the scale factor is represented by a maximum value of the Measured curve divided by a maximum value of the Reference curve.

14. The printing system of claim 13 wherein the calibration module calculates a maximum transition rate.

15. The printing system of claim 14 wherein the calibration module receives a specified transition rate for the Target curve.

16. The printing system of claim 15 wherein a larger specified transition rate results in the Target Curve following the Reference curve longer prior to transitioning to the Measured curve.

17. The printing system of claim 15 wherein the calibration module computes the Target curve.

18. The printing system of claim 17 wherein the Target curve is computed by multiplying the specified transition rate with a weighting function.

19. The printing system of claim 17 wherein the calibration module converts the data corresponding to the Measurement curve and the data corresponding to the Reference curve to a common unit of measure.

20. The printing system of claim 19 wherein the calibration module subtracts a zero-point from data corresponding to the Measurement curve and the data corresponding to the Reference curve.

* * * * *